July 7, 1936.   K. J. TOBIN   2,046,856
AUTOMOBILE SUPPORTING STRUCTURE
Filed Oct. 8, 1932   4 Sheets-Sheet 1
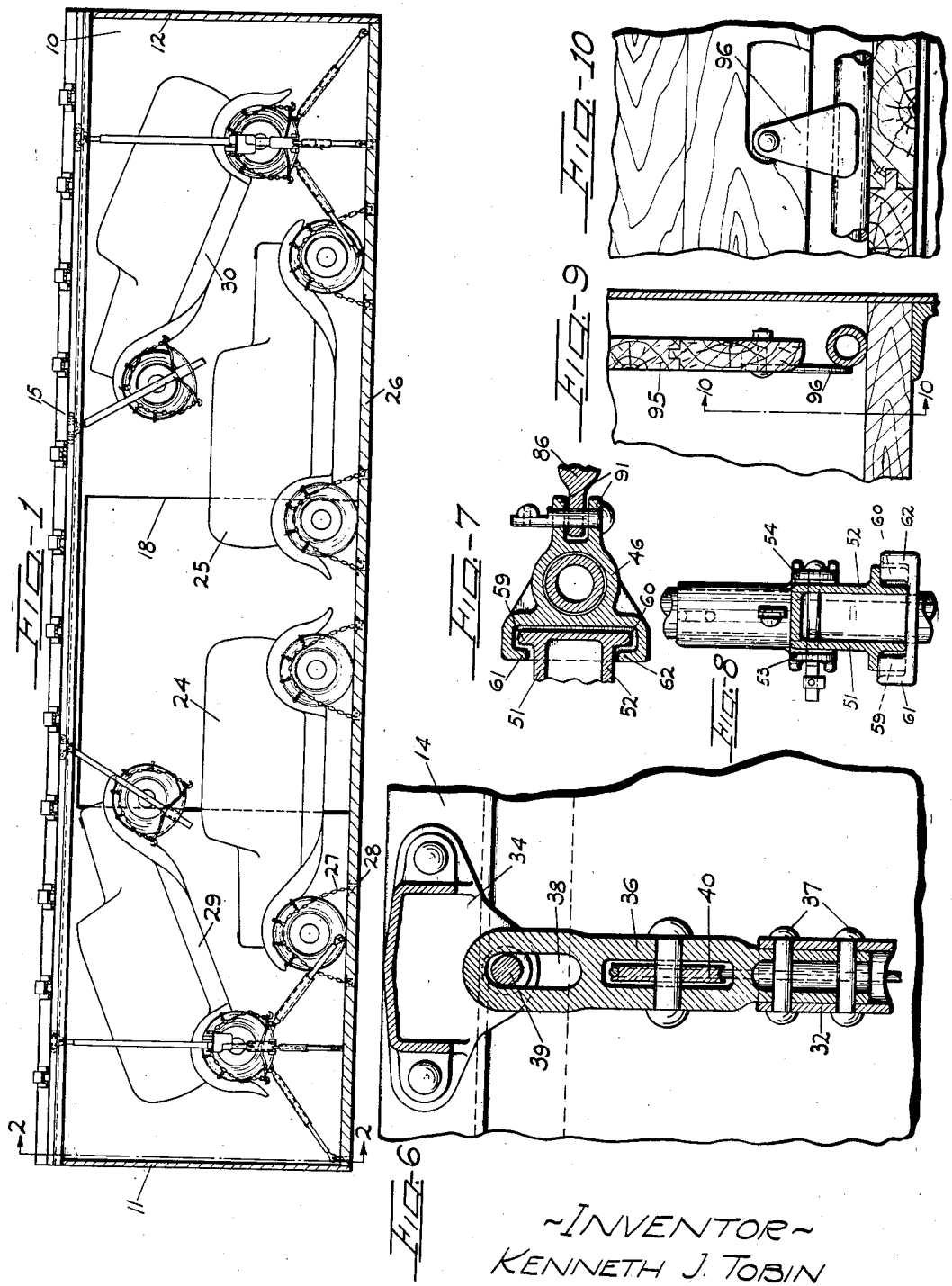
~INVENTOR~
KENNETH J. TOBIN
By~ Samuel Reese
ATTY.

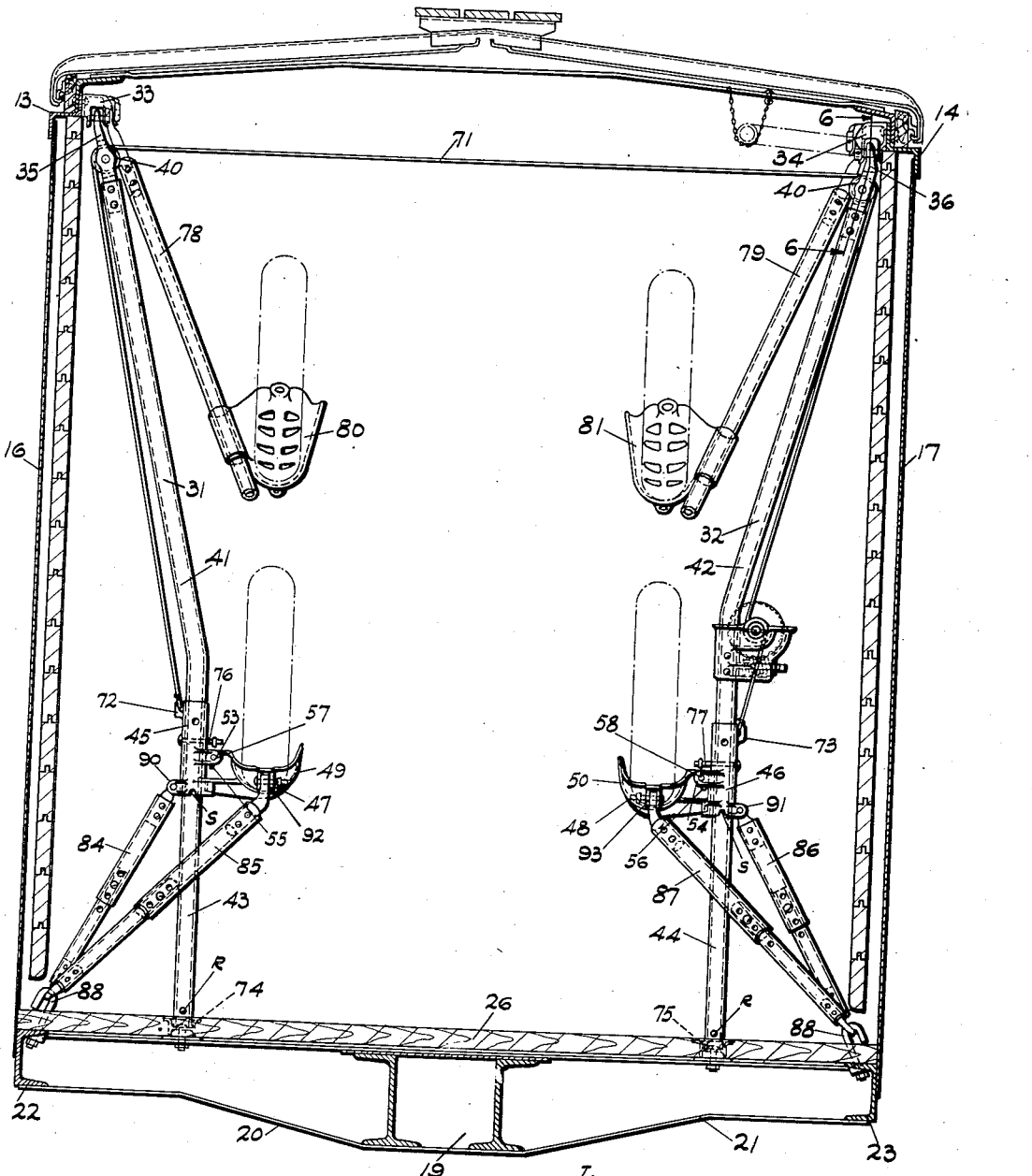

July 7, 1936.　　　　K. J. TOBIN　　　　2,046,856
AUTOMOBILE SUPPORTING STRUCTURE
Filed Oct. 8, 1932　　　4 Sheets-Sheet 3
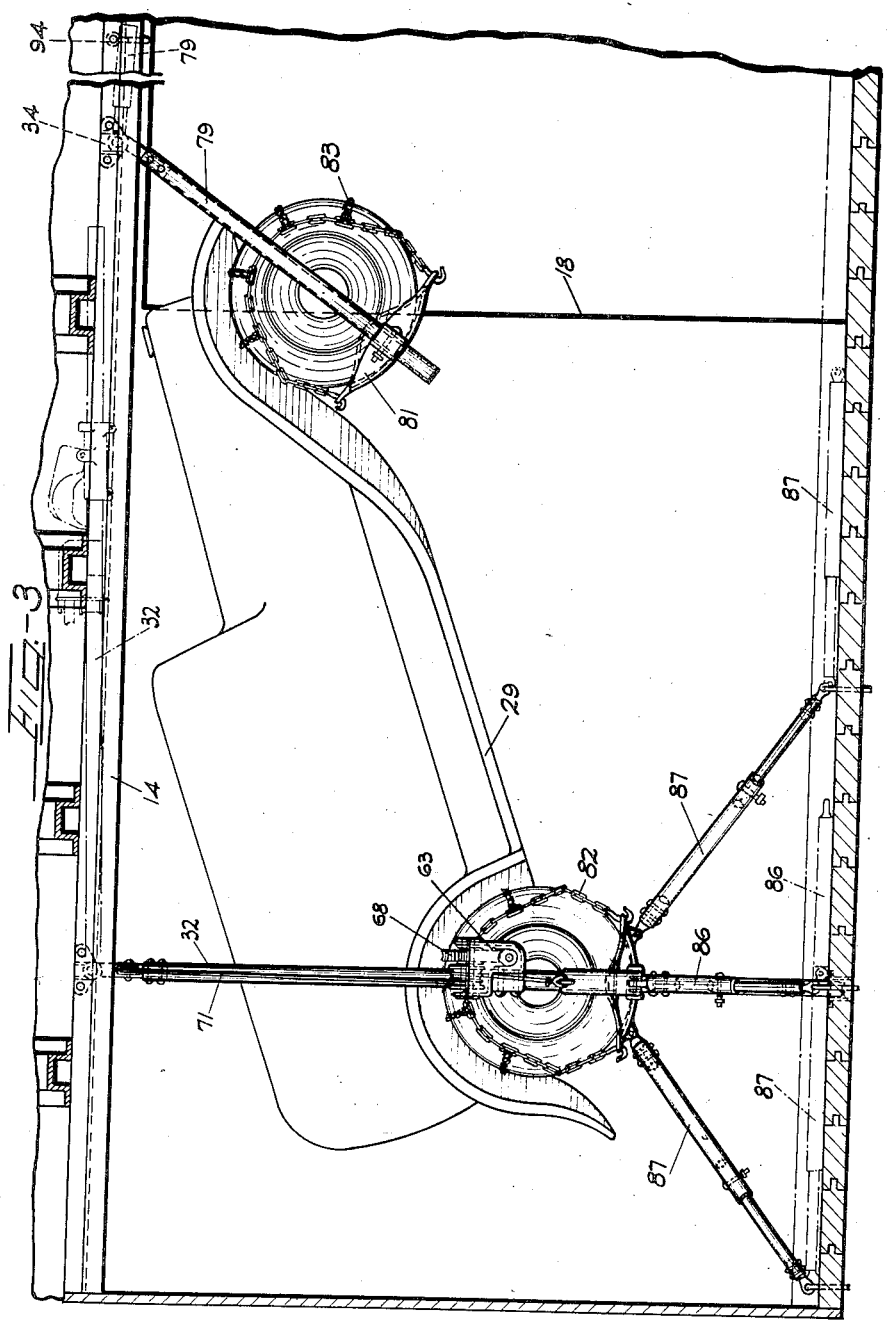
INVENTOR
KENNETH J. TOBIN
By Samuel Reese
ATTY.

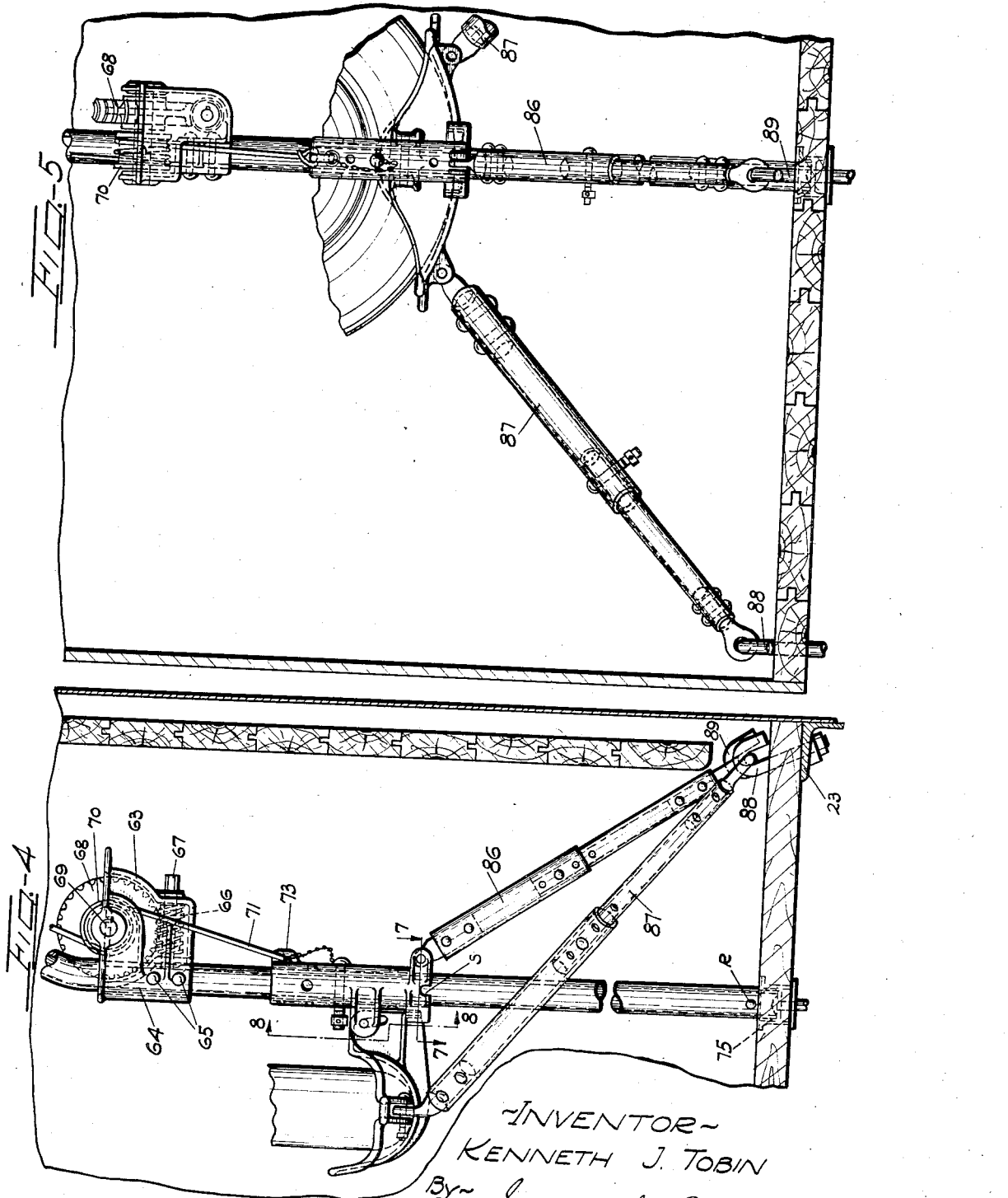

Patented July 7, 1936

2,046,856

UNITED STATES PATENT OFFICE 2,046,856

AUTOMOBILE SUPPORTING STRUCTURE

Kenneth J. Tobin, Chicago, Ill., assignor, by mesne assignments, to Evans Products Company, Detroit, Mich., a corporation of Delaware Application October 8, 1932, Serial No. 636,799

20 Claims. (Cl. 105—368)

This invention relates to improvements in automobile supporting structures and particularly to those structures which are intended to form a permanent part of the equipment of a railway house car or the like.

In the transportation of automobiles in railway house cars of the usual length, that is, 40' 6", it is desirable that four automobiles of all but the very long wheel base automobiles be loaded into a single car to effect the most economical shipment. To obtain such a load with the maintenance of proper clearances between the automobiles in a freight car of the type mentioned an automobile is supported in each end of the car in inclined position above the floor of said car so that sufficient space is afforded for positioning two additional automobiles upon the floor of the car in back to back relationship with portions thereof extending under the elevated automobiles. Structures have heretofore been utilized for supporting automobiles in elevated position in railway house cars but these structures, which were made of wood, did not constitute permanent equipment for the car and were destroyed when being taken from the car. Additionally, these wood structures were required to be nailed to the floor and sheathing of the car and in the operations of placing and removing said structures the car was seriously damaged. Attempts were made to design supporting structures having the quality of permanence but these proposed structures involved a serious increase in weight, expense, modification of car structure, and introduced the further acute problem of maintaining the cars in which they were installed in the category of all purpose cars. In other words, such structures inherently confined the cars in which they were placed to the shipment of automobiles to the exclusion of other classes of commodities.

This invention, therefore, has for its main object the provision of automobile supporting structures capable of installation in railway house cars with minimum modification of said cars to form a permanent part of the equipment thereof and which shall be inexpensive, sturdy, light in weight, and not affect the all purpose utility of the cars in which installation is made.

A further object is to provide an automobile supporting structure for railway house cars which carries means for elevating an automobile within the car.

A further object is to provide an automobile supporting structure embodying automobile elevating mechanism and adapted to be secured adjacent the car roof, arranged to transfer the weight of the automobile to the underframe of the vehicle in which said structure is installed.

A further object is to provide an automobile supporting structure for railway house cars including bars pivotally connected to the side plates of said car and arranged to carry the weight of the automobile to the underframe of the car, said structure embodying slidable automobile engaging members together with means for sliding said members upon said bars.

A further object is to provide automobile supporting structures for railway house cars including bars and automobile engaging members slidable thereon, and means including tension means for effecting movement of said members to elevate the automobiles, the weight of the automobiles being carried by the bars to the underframe of the car whereby to relieve the tension means of said weight.

A further object is to provide automobile supporting structures for railway house cars having supports carrying slidable automobile engaging members and flexible tension means secured to said members and means for reeling said tension means to elevate the automobile.

A further object is to provide novel automobile supporting structures for a railway house car including members carrying means for elevating one end of an automobile above the floor of said car.

A further object is to provide novel automobile supporting structures for a railway house car including members carrying means engageable with said automobile at opposite sides thereof for simultaneously elevating both sides of the automobile to the same height above the floor of said car.

A further object is to provide an automobile supporting structure for a railway house car comprising a plurality of bars pivotally connected to the side plates of said car and having means including slidable members for engaging and elevating one end of an automobile.

A further object is to provide means for supporting an automobile in a vehicle in inclined elevated position relative to the floor of said vehicle, the supporting means being independently controlled for determining the inclination of the automobile.

A further object is to provide an automobile supporting structure for a railway house car, said structure being provided with sliding sleeves or collars carrying automobile wheel receiving members having pivotal and releasable interlocking engagement with said sleeves.

A further object is to provide automobile supporting structures for railway house cars having automobile wheel receiving members arranged to permit positioning and retention of said supports in inoperative position adjacent the roof of the car without materially decreasing the head room in the car.

A further object is to provide automobile supporting structures for railway house cars comprising bars pivotally connected to the side plates of the cars and having one portion thereof positioned at an angle to the floor of the cars and another portion perpendicular to said floor.

A further object is to provide adjustable braces for automobile supporting means for railway house cars adapted to be secured adjacent the floors of said cars and to be retained in inoperative position below the lining of said cars so as to form part of the permanent equipment of said cars and not to encroach upon the loading space thereof.

Other objects of the invention will become apparent as the description thereof proceeds.

In the drawings forming part of this specification

Figure 1 is a longitudinal view of a railway house car looking at one side of the car with the sheathing and lining removed therefrom to illustrate the invention and the arrangement of automobiles in said car;

Figure 2 is a transverse section taken on line 2—2 of Figure 1, the wheels only of the automobile being illustrated for the sake of clearance;

Figure 3 is a view similar to Figure 1 on an enlarged scale, showing a structure for supporting and bracing an elevated automobile and, in dot and dash lines, the inoperative position of the supporting structure;

Figure 4 is an enlarged partial elevation of one of the supporting members showing the elevating mechanism carried by said member as well as bracing means;

Figure 5 is an enlarged end view of the structure shown in Figure 4, looking toward the left in said figure;

Figure 6 is a vertical section taken on line 6—6 of Figure 2;

Figure 7 is a horizontal section taken on line 7—7 of Figure 4;

Figure 8 is a vertical section taken on line 8—8 of Figure 4;

Figure 9 is a sectional detail showing the inoperative position of the braces; and Figure 10 is a detail view looking in the direction of the arrows 10—10 of Figure 9.

Referring to the figures of the drawings in which a preferred embodiment of the invention is illustrated, there is disclosed a railway car 10 of the house type provided with the usual end structures 11 and 12, side plates 13 and 14, and a roof indicated generally at 15. The sides 16 and 17 of the railway house car are provided with door openings such as indicated at 18, which are of extraordinary width commonly employed in railway house cars adapted for the shipment of automobiles. The car is additionally provided, as is customary in car construction, with a center sill 19, cross bearers 20 and 21 and side sills 22 and 23. It is to be understood that the invention is not limited to the particular house car illustrated but that it is applicable to house cars of any type and, in fact, to any vehicle not a railway house car provided with the general features above set forth.

With reference to Figure 1 of the drawings it will be observed that four automobiles are positioned in the car. The automobiles 24 and 25 rest upon the floor 26 of the car and are secured to said floor against excessive movement during shipment of the automobiles. The securement of the automobiles 24 and 25 is obtained by means of chains 27 embracing the wheels of the automobiles and secured to anchoring sockets 28 positioned in the floor of the car. The four automobile load illustrated in Figure 1 of the drawings is obtained by the positioning of the automobiles 29 and 30 in inclined elevated position above the floor of the car. By virtue of the positioning of the automobiles 29 and 30 the automobiles 24 and 25 may be placed within the car as illustrated.

In the positioning and securement of the inclined elevated automobiles 29 and 30 as illustrated in Figure 1 of the drawings the novel structure of the instant invention is utilized. In view of the fact that this structure, employed to properly position the automobile 29, is the same as that utilized in positioning of the automobile 30 reference to the structure for one of these automobiles only will be made. As shown in the drawings the novel structure is utilized preferably for elevating and supporting the rear end of an inclined automobile. This structure comprises a plurality of bars 31 and 32. Each of these bars, as clearly shown in Figures 2 and 6 of the drawings, is connected to the side plates 13 and 14 of the car by means of brackets 33 and 34 secured to said side plates. The bars preferably take the form of tubular members into the upper ends of which the members 35 and 36, preferably castings, are inserted and secured as by the rivets 37. These members are provided with elongated slots such as indicated at 38, through which pins such as 39, secured to the brackets 33 and 34, extend. Each of the bars 31 and 32 by the construction above described is, consequently, slidably and pivotally mounted upon the side plates of the car for a purpose which will later appear. Each of the members 35 and 36 is provided with a pulley 40.

The bars 31 and 32 include upper portions 41 and 42 and lower portions 43 and 44, it being observed that the upper and lower portions of each bar are angularly related and that the upper portions of the bars converge downwardly from their engagement with the side plates of the cars while the lower portions of said bars are substantially parallel to each other so as to extend perpendicularly to the floor of the car. Sleeves or collars 45 and 46 are mounted upon the lower portions 43 and 44, respectively, of the bars. These slidable collars carry substantially trough shaped automobile wheel engaging members 47 and 48. The wheel engaging members comprise the trough shaped body portions 49 and 50 from each of which ears, such as 51 and 52, extend. Each slidable sleeve is provided with a plurality of spaced ears, such as 53 and 54, between which the upper portions of the ears 51 and 52, provided on the wheel engaging members, are positioned. Securement between the upper portion of the ears provided on the wheel engaging members and the ears provided on the slidable sleeves is effected by means of pin and slot connections, slots 55 and 56 being formed in the ears 51 and 52 through which pins 57 and 58 extend. Further connection between the ears formed on the wheel engaging members and the slidable sleeves is provided. This connection, as clearly shown in Figure 7 of the drawings, is an interlocking one and is obtained by means of the engagement of the outwardly extending lugs 59 and 60 between the slidable collar 46 and spaced inwardly directed flanges 61 and 62. By the above described securement it is apparent that the wheel receiving members are securely engaged with the slidable sleeves so as to effectively sustain the weight of an automobile supported by said wheel engaging members. Moreover, this securement permits the ready disengagement of the automobile wheel supporting members from its interlocking connection with the slidable sleeves and the pivoting of said members upon the bars so that when said bars are raised adjacent the roof of the car and supported therefrom in inoperative position very little head room of the car is taken up by said bars.

The supporting bars 31 and 32 are provided with mechanism for elevating an end of an automobile to be placed in inclined position above the floor of a railway house car. In the instant embodiment of the invention this mechanism incorporates a housing member 63 preferably in the form of a casting and provided with a tubular portion 64 by means of which the housing member may be mounted upon one of the bars and rigidly secured thereto by means of rivets 65. A worm 66 having a squared outer end 67 is mounted within the housing member 63. A worm gear 68 is positioned within the housing member in meshing engagement with the worm 66. The worm gear 68 is mounted within the housing member upon a shaft 69, which carries additionally a drum 70. The worm gear and the drum may be fastened upon the shaft 69 in any desired manner, such as by key way and key construction so as to rotate with the shaft. A flexible member 71, which may take the form of a cable or, if desired, chains, is fastened at one end to a lug 72 provided on the slidable collar 45. From its fastening to the slidable collar 45 the flexible member 71 extends upwardly and passes over the pulleys 40 and then downwardly into engagement with the drum 70. The engagement between the flexible member 71 and the drum 70 is obtained preferably by extending the flexible member through the drum, as clearly indicated in Figure 4 of the drawings. From the drum the flexible member extends downwardly and is secured to an ear 73 provided on the slidable collar 46.

Assuming that it is desired to support an automobile in inclined elevated position in the car 10, the supporting bars 31 and 32 are positioned upon the underframe of the car and preferably the lower ends of said bars are seated within sockets 74 and 75 provided in the floor 26 of the car. These sockets, as clearly illustrated in Figure 2 of the drawings, are preferably secured to the cross bearers 20 and 21. The worm 66 is then actuated by means of a motor mounted upon the squared end 67 of the worm or by means of a hand crank or the like to lower the slidable collars 45 and 46 upon the bars 31 and 32 until said collars, together with their automobile wheel engaging members 47 and 48 rest upon the floor of the car. Disengagement of the collars from the bars is prevented by the rivets R which are adapted to be received in the recesses S formed in the collars to permit seating of the collars and automobile wheel engaging sleeves upon the floor of the car. An automobile, such as 29, is then positioned in the car with its rear wheels received within the wheel receiving portions 49 and 50 of the wheel engaging members 47 and 48. The worm 66 is then actuated in the opposite direction and by its engagement with the worm gear 68 the drum 70 is rotated in order to wind the flexible member 71 thereon so as to slide the collars 45 and 46 upon the lower portions 43 and 44 of the supporting bars to the desired elevated position of the rear end of the automobile. When such position has been reached toggle bolts 76 and 77 are inserted through aligned openings in the bars and in the slidable collars to maintain the elevated end of the automobile in the desired position. In view of this fastening between the slidable collars and the bars and in view of the pin and slot connections 38 and 39 between the upper ends of the bars and the side plates 13 and 14 it will be apparent that the weight of the elevated end of the automobile is carried to the underframe of the car so that the superstructure of the car is free of such weight. It is apparent from this construction that the weight of the elevated end of the automobile is supported by the strongest part of the car structure. The fastening of the collars upon the bars by means of the toggle bolts permits, additionally, the slacking off of the flexible member 71 so as to eliminate the tension therefrom. The front end of the automobile may be elevated as by means of a hand hoist to the desired position and supported in said position by means of the bars 78 and 79 secured to the side plates 13 and 14 of the car as shown in Figure 3 of the drawings by means of the engagement of the wheels at said end of the automobile, within wheel receiving members 80 and 81 carried by said bars. Hold down devices, such as the chains 82 and 83, may be used to fasten the rear and front wheels of the automobile, respectively, to the wheel receiving members.

A plurality of braces 84 and 85 are secured preferably to the slidable collar 45 and to the wheel receiving member 47 to prevent both side-sway and longitudinal movement of the elevated automobile. Similar braces 86 and 87 are secured to the slidable collar 46 and the wheel receiving member 48 for the same purpose. Each of these braces is secured adjacent the floor of the car by means of the J bolts 88 and 89 extending through the floor of the car and fastened to the side sills 22 and 23. Each of the braces 85 and 86 is formed preferably of a plurality of telescoping pipes, as clearly indicated in Figure 4 of the drawings, these pipes being provided with a plurality of holes so as to permit adjustment of the braces. The braces 84 and 86 are secured to pairs of ears 90 and 91 provided, respectively, upon the collars 45 and 46. The braces 85 and 87, similarly, comprise a plurality of telescoping pipes provided with a series of holes to permit adjustment of said braces. The braces 85 and 87 are secured to the wheel receiving members 47 and 48 by means of toggle bolts extending through the pairs of ears 92 and 93 of the wheel receiving members 47 and 48 and the upper ends of the braces.

The construction of the supporting structure carrying the elevating mechanism is such that it may be stored adjacent the roof of the railway car without encroaching to any great extent upon the head room of the car. Such storage may be had by disengaging the braces from the wheel receiving members and the slidable collars. The lower ends of the bars may thus readily be disengaged from the sockets 74 and 75 by means of the pin and slot connection of said bars with the side plates of the car. The wheel receiving members 47 and 48 are raised relative to the slidable collars so as to break the interlocking engagement between them, whereupon said wheel engaging members may be pivoted upon the pins 57 and 58 so that when said collars and wheel receiving members are rotated through an angle of ninety degrees the wheel receiving members will lie upon the bars. The bars may then be swung substantially parallel to the sides of the car to the roof thereof where they may be secured in any desired manner, chains secured to the roof of the car being illustrated for this securement. The chains, such as 82 and 83, have previously been removed from the automobile wheels and these chains, together with the wheel receiving members 80 and 81, may be stored in a box provided in the floor of the car. The bars 78 and 79 may be swung in a plane substantially parallel to the sides of the cars and supported by means of hooks 94 from the side plates of the car.

The braces 84, 85, 86 and 87 are also adapted to be retained in their inoperative position in such manner as not to encroach upon the loading area of the car. These braces, as clearly indicated in Figures 9 and 10 of the drawings, are adapted to be positioned upon the floor of the car beneath the inner lining 95. In this position latches, such as 96, pivotally secured to the inner lining, engage the braces so as to retain them in their proper position.

It is apparent that numerous changes and modifications in the details of the structure hereinbefore described will occur to those skilled in the art. It is intended, therefore, that all such changes and modifications be comprehended within this invention, which is to be limited only by the scope of the claims appended hereto.

I claim:

1. An automobile supporting structure for railway house cars comprising a substantially vertically extending bar adapted to be secured to said car, an automobile engaging member slidably mounted upon said bar, operating means carried by said bar and means independent of said bar connecting said operating means with said member for sliding said member upon said bar.

2. An automobile supporting structure for railway house cars comprising a substantially vertically extending bar adapted to be secured to said car, an automobile engaging member slidably mounted upon said bar, said member including a collar slidable upon said bar and an automobile wheel receiving portion extending therefrom, operating means carried by said bar and means independent of said bar connecting said operating means with said member for sliding said member upon said bar.

3. An automobile supporting structure for railway house cars comprising a substantially vertically extending bar adapted to be secured to said car, a collar mounted upon said bar for relative sliding movement, an automobile wheel receiving member pivotally connected to said collar, said member being interlocked with said collar and operating means carried by said bar connected to said collar for imparting movement thereto.

4. An automobile supporting structure for railway house cars comprising a substantially vertically extending bar adapted to be secured to said car, a slidable collar upon said bar, an automobile wheel receiving member having interlocking engagement with said collar, means connecting said member and said collar whereby said interlocking engagement may be released, operating means carried by said bar, and a connection between said collar and said operating means.

5. An automobile supporting structure for railway house cars comprising a substantially vertically extending bar adapted to be secured to said car, a slidable collar upon said bar, an automobile wheel receiving member carried by said collar and operating means carried by said bar, said means including a drum and a flexible connection between said drum and said collar.

6. An automobile supporting structure for railway cars comprising a plurality of bars secured to a car, a collar having a smooth bore slidably mounted upon each of said bars, automobile wheel engaging members depending from said collars, means connecting said collars for simultaneous and uniform movement upon said bars, and operating means carried by one of said bars having operative engagement with said connecting means for imparting movement to said collars.

7. An automobile supporting structure for railway house cars comprising a plurality of transversely spaced bars secured to a car, a slidable sleeve upon each of said bars, a cable fastened to one of said sleeves, pulleys mounted upon said bars, said cable passing over said pulleys and fastened to said other sleeve, and means carried by one of said bars for winding and unwinding said cable thereon to impart movement to said sleeves.

8. An automobile supporting structure for railway cars comprising a plurality of bars secured to a car, a slidable sleeve upon each of said bars, means connecting said sleeves for simultaneous and uniform movement upon said bars, and operating means including a drum carried by one of said bars, said connecting means being adapted to be wound upon said drum whereby movement may be imparted to said sleeves.

9. An automobile elevating and supporting structure for railway house cars comprising a bar adapted to be pivotally secured to the superstructure of the car adjacent each side thereof, a slidable member upon each bar adapted to engage a portion of an automobile, means carried by said bars for sliding said members to elevate said automobile, said bars being swingable in planes substantially parallel to the sides of said car to positions adjacent the roof of the car, and means carried by said roof for retaining said bars in said positions.

10. An automobile elevating and supporting structure for railway house cars comprising oppositely positioned bars secured to the side plates of said car, the lower ends of said bars being supported upon the underframe of said car, automobile wheel engaging members slidably supported on said bars adapted to receive wheels at one end of said automobile, elevating means carried by said bars for simultaneously and uniformly sliding said members upon said bars to elevate said end of the automobile, and means fixedly securing said members to said bars whereby the weight of said end of the automobile is transferred to the car underframe.

11. An automobile elevating and supporting structure for railway house cars comprising a bar secured to one side of a car at its upper end and having its lower end supported upon the underframe of said car, a second bar similarly secured and positioned at the opposite side of said car, said bars lying substantially in the same plane, automobile wheel receiving members slidable upon said bars adapted to engage the wheels at one end of an automobile, elevating means including a flexible cable for simultaneously and uniformly sliding said members upon said bars to elevate said end of the automobile, means fixedly securing said members to said bars in the elevated position of the automobile, whereby the weight of said end of the automobile is transferred to the underframe of the car and the tension in said cable may be released.

12. An automobile elevating and supporting structure for railway house cars comprising a bar secured to one side of a car at its upper end and having its lower end supported upon the underframe of said car, a second bar similarly secured and positioned at the opposite side of said car, said bars lying substantially in the same plane, the upper portions of said bars converging downwardly and the lower portions thereof being substantially perpendicular to the floor of said car, automobile wheel receiving members slidable upon the lower portions of said bars adapted to engage the wheels at one end of an automobile, elevating means including a flexible cable for simultaneously and uniformly sliding said members upon said bars to elevate said end of the automobile, and means fixedly securing said members to said bars in the elevated position of the automobile, whereby the weight of said end of the automobile is transferred to the underframe of the car and the tension in said cable may be released.

13. An automobile supporting structure for railway cars comprising a plurality of bars secured to a car, a slidable collar upon each of said bars, automobile wheel engaging members depending from said collars, means connecting said collars for simultaneous and uniform movement upon said bars, and operating means carried by one of said bars having operative engagement with said connecting means for imparting movement to said collars, and adjustable braces secured to the floor of said car and to said collars.

14. An automobile supporting structure for railway cars comprising a plurality of bars secured to a car, a slidable collar upon each of said bars, automobile wheel engaging members depeding from said collars, means connecting said collars for simultaneous and uniform movement upon said bars; and operating means carried by one of said bars having operative engagement with said connecting means for imparting movement to said collars, and adjustable braces secured to the floor of said car and to said collars and said wheel engaging members.

15. In a railway freight car, means for supporting an automobile in elevated position having braces secured to the floor of said car and to said means to prevent swaying of said automobile, said braces being normally disposed upon the floor of said car below the inner lining thereof and latching means pivotally mounted upon said lining to retain said braces in stored position, said braces being releasable from their normal position for attachment to said supporting means for the purpose set forth.

16. In a railway house car, a plurality of bars, each upper end of a bar being secured to the opposite side plates of said car, sockets secured to the floor of said car, the lower ends of said bars being seated in said sockets, automobile wheel engaging members slidably mounted upon said bars, and means having operative engagement with said members and carried by said bars for sliding said members upon said bars.

17. An automobile supporting structure for placement in and securement to railway house cars comprising a substantially vertically extending non-rotatable bar secured to said car, an automobile engaging member slidably mounted upon said bar, and operating means carried by said bar and connected with said member for sliding said member upon said bar.

18. An automobile elevating and supporting structure for placement in and securement to railway house cars comprising a substantially vertically extending bar secured to said car, an automobile elevating member slidably mounted upon said bar, and operating means carried by said bar and connected with said member for sliding said member upon said bar.

19. An automobile elevating and supporting structure for placement in and securement to railway house cars comprising a substantially vertically extending bar secured to said car, an automobile elevating member slidably mounted upon said bar, operating means carried by said bar and means independent of said bar connecting said operating means with said member for sliding said member upon said bar.

20. An automobile elevating and supporting structure for placement in and securement to railway house cars comprising a substantially vertically extending non-rotatable bar secured to said car, an elevating member slidably mounted upon said bar and operating means carried by said bar and connected with said member for sliding said member upon said bar.

KENNETH J. TOBIN.